United States Patent [19]

Smart

[11] Patent Number: 5,417,445
[45] Date of Patent: May 23, 1995

[54] CYCLES

[76] Inventor: David G. Smart, 121 The Avenue, Sunbury-on-Thames, Middlesex TW16 5EQ, England

[21] Appl. No.: 79,500

[22] Filed: Jun. 18, 1993

Related U.S. Application Data

[63] Continuation of Ser. No. 857,695, Mar. 25, 1992, abandoned, which is a continuation of Ser. No. 598,724, Oct. 18, 1990, abandoned.

[30] Foreign Application Priority Data

Apr. 8, 1988 [GB] United Kingdom ............... 8808178
Nov. 17, 1988 [GB] United Kingdom ............... 8826905

[51] Int. Cl.⁶ ............................................. B62K 25/04
[52] U.S. Cl. .................................. 280/275; 280/277; 280/283; 280/284
[58] Field of Search ............... 280/281.1, 283, 284, 280/286, 275, 276, 277, 274, 703; 180/219, 224, 205, 231

[56] References Cited

U.S. PATENT DOCUMENTS

| | | | |
|---|---|---|---|
| 2,194,103 | 3/1940 | Tibbals | 280/283 |
| 2,976,056 | 3/1961 | Henry | 280/277 |
| 4,378,857 | 4/1983 | Andersson | 280/275 |
| 4,398,741 | 8/1983 | Hiramatsu | 280/275 |
| 4,421,337 | 12/1983 | Pratt | 280/277 |
| 4,583,612 | 4/1986 | Parker | 280/275 |
| 4,650,027 | 3/1987 | de Cortanze | 280/277 |
| 4,775,025 | 10/1988 | Parker et al. | 280/275 |

FOREIGN PATENT DOCUMENTS

| | | | |
|---|---|---|---|
| 3623567 | 1/1988 | Germany | 180/219 |
| 0012736 | of 1901 | United Kingdom | 280/283 |

Primary Examiner—Margaret A. Focarino
Assistant Examiner—Anne Marie Boehler
Attorney, Agent, or Firm—Edwin D. Schindler

[57] ABSTRACT

A pedal cycle is disclosed, which has a rear wheel suspension pivoted to the main frame and a front wheel suspension pivotally and slidably mounted to the main frame. Front and rear suspensions are provided and are interconnected, for example, by a rod to transmit forces between them. Any load on one wheel, tending to lift that wheel by movement of its suspension relative to the main frame, is transmitted to the other suspension thereby tending to lift that suspension relative to the main frame. Further, load placed on the front suspension by a rider pushing downward on a forward pedal causes a force to be transmitted to the rear suspension in opposition to a force applied to the rear suspension by a tension developed in the transmission chain owing to the force applied by the rider to the forward pedal. The interaction between transmission and suspension provides for a cycle with better responsiveness than in a conventional cycle.

3 Claims, 4 Drawing Sheets

– CYCLES

CROSS-REFERENCE TO RELATED APPLICATIONS

This application is a continuation of application Ser. No. 07/857,695, filed Mar. 25, 1992, now abandoned which is a continuation of application Ser. No. 07/598,724, filed Oct. 18, 1990, now abandoned.

BACKGROUND OF THE INVENTION

1. Field of the Invention

This invention relates to cycles, particularly pedal bicycles but the teachings of the invention are also applicable to mopeds and tricycles.

2. Description of the Prior Art

Cycles are prone to punctures and their performance is limited by reliance upon pneumatic tyres as the only cushion against shock and vibration. It has been proposed to incorporate resilient suspension but it is a drawback of suspension systems hitherto proposed that the rider's effort on the pedals is partly absorbed by the suspension, so that the cycles concerned are not suitable for racing.

SUMMARY OF THE PRESENT INVENTION

In accordance with this invention there is provided a pedal cycle of variable geometry, where front and rear suspensions are interconnected and the configuration of the rear suspension establishes an equilibrium between opposing forces in the suspension and transmission.

In an embodiment which will be described herein, the rear wheel is mounted to a sub-frame which is pivotally mounted to the main frame of the cycle. The front wheel is mounted to the front forks and the assembly of front forks and steering column is slidably and pivotally mounted to the main frame. The suspensions (i.e. the rear sub-frame and the front assembly of front forks and steering column) are interconnected so that any load on one wheel, tending to lift that wheel by movement of its suspension relative to the main frame, is transmitted also to the other suspension tending to lift its wheel by movement of that suspension relative to the main frame. Means are provided to resiliently oppose such movements of the suspensions. In one embodiment to be described herein, the front and rear suspensions are interconnected by a rod which extends through a tubular element of the main frame which houses at least one compression spring for opposing movement of the rod, in response to loading on either wheel. In a modification, a lost-motion device may be included in the interconnection (e.g. in the rod just described) between front and rear suspensions. In another embodiment to be described herein, each suspension includes a resilient element independently opposing displacement of that suspension relative to the main frame, and a cable interconnects the two suspensions for transmitting a force under tension from one suspension to the other. The resilient elements may comprise bodies of rubber or other resilient material which are mounted to the main frame, with a peg projecting from a moving element of the respective suspension and into the respective resilient body.

In the embodiments to be described herein, the rear suspension pivot is positioned above the transmission line. As a result, the chain tension balances the reaction in the suspension resulting from the force exerted on the pedals.

Also in accordance with this invention, there is provided a pedal cycle having a main frame structure connecting four parallel bores being points of attachment for the crank axle, a rear suspension pivot, a front suspension pivot and the steering tube pivot. The main frame may additionally include a fifth bore being a point of attachment for a lever arm of the interconnection system of the front and rear suspensions. The main frame may include another bore being a point of attachment for a brace to the seat tube. The main frame may include further bores receiving the resilient bodies referred to above, which resiliently oppose displacement of the respective suspensions.

It will be appreciated that because the main frame includes a plurality of bores, all parallel to each other, for mounting or attachment to the frame of the necessary components and assemblies of the cycle, the frame lends itself to being moulded, the two halves of the mould being separated along an axis perpendicular to the plane of the frame.

BRIEF DESCRIPTION OF THE DRAWINGS

Embodiments of this invention will now be described by way of examples only and with reference to the accompanying drawings, in which.

DETAILED DESCRIPTION OF PREFERRED EMBODIMENTS

Figure 1:
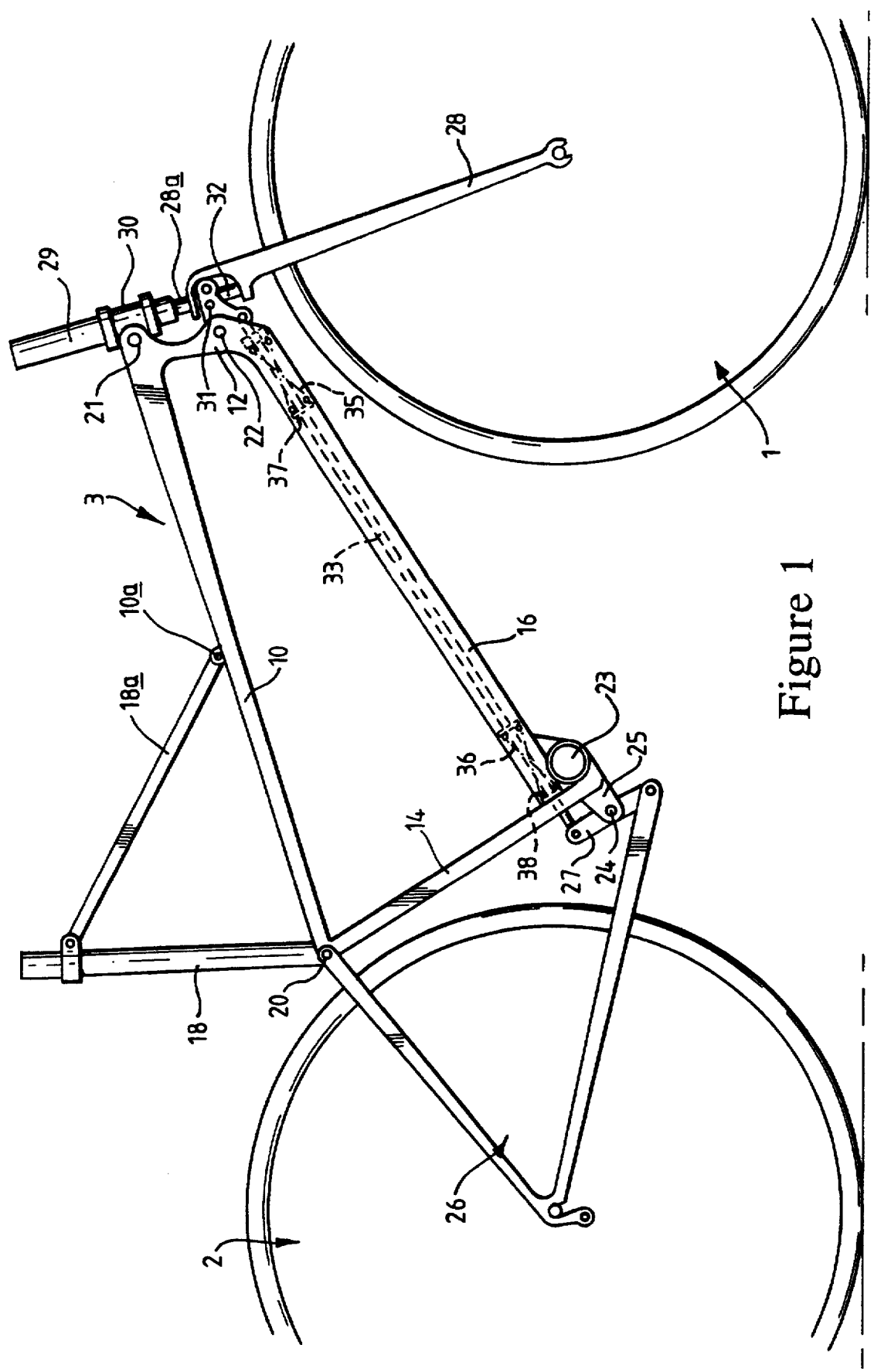
FIG. 1 is a diagrammatic side view of a pedal bicycle in accordance with one embodiment of the invention.

Referring to FIG. 1 of the drawings, there is shown a pedal bicycle comprising front and rear wheels 1,2 and a main frame 3. For the sake of simplicity the pedals and transmission to the rear wheel are not shown and moreover the seat and handlebars are omitted. The main frame 3 comprises an upper, straight element 10, a short, generally vertical element 12 extending downwards from the front end of the element 10, a longer straight element 14 extending downwardly and forwardly from the rear end of the element 10, and a lower straight element 16 which extends forwardly and upwardly from the lower end of element 14 to the lower end of element 12. The main frame further comprises an upright seat tube 18 extending from the rear end of the element 10. The main frame may be constructed of tubular metal or it may be die-cast. The main frame is formed with six through-bores all parallel to each other and perpendicular to the plane containing the main frame, these six bores being at 20 (at the junction of elements 10 and 14), at 21 (junction of elements 10 and 12), at 22 (adjacent the lower end of element 12), at 23 (adjacent the junction of elements 14 and 16), at 24 (on a projection 25 extending downwardly and rearwardly from the junction of elements 14 and 16,) and at 10a (to form a point of attachment for seat tube brace 18a). The bore 23 serves to mount the crank axle, whilst the functions of bores 20–22 and 24 will be described below.

The rear wheel 2 is rotatably mounted to a rear suspension 26 which comprises a bifurcated V-shape subframe, the free end of the upper elements being pivoted to the main frame by a bearing extending through the bore 20, at which point the seat tube 18 is also pivotally mounted. The free ends of the lower elements of the sub-frame are pivoted to one end of a lever arm 27, which is pivoted intermediate its ends to the extension 25 of the main frame, using the bore 24. It will be noted that the rear suspension pivot 20 is above the transmission line i.e. the line from the crank axle 23 to the rear wheel axle.

The front wheel 1 is rotatably mounted to the front forks 28 of the bicycle. The front forks 28 are fixed to the lower end of a steering column 28a which has a longitudinally splined upper end fitted into a similarly splined lower end of a steering tube 29, to which the handlebars are fitted. The steering column 28a is therefore slidable relative to the steering tube 29 but turns therewith. The steering tube 29 passes through a tubular collar 30 and is mounted thereto on bearings giving axial and radial support yet permitting turning of the steering tubes 29.

A front suspension of the bicycle comprises a crank element 31 pivotally mounted to the main frame 3 using the bore 22. A leg of the crank which projects forwardly from the pivotal mounting at 22 is pivoted to a tubular collar 32 on the lower end of the steering column 28a.

The front and rear suspensions of the bicycle are interconnected by a rod 33 extending through the lower element 16 of the main frame. The rear end of rod 33 emerges from the main frame and is pivoted to the upper end of the lever arm 27. The forward end of the rod 33 emerges from the main frame and is pivoted to the free end of a leg of the crank 31 which projects downwardly from its pivot 22. Compression springs 35, 36 are mounted in the main frame element 16 adjacent its top and bottom ends respectively, encircling the rod 33. Washers 37 and 38 are fixed to the rod 33 and serve to compress spring 35 or 36 upon movement of the rod 33 forwardly.

It will thus be seen that the pedal cycle of FIG. 1 is of variable geometry by reason of the front and rear suspensions being movable relative to the main frame. Also, the suspension components may be replaced by others of different size and shape to allow bicycles or selected geometry to be built using the one design of main frame. The front and rear suspensions are interconnected by the rod 33, so that movement of one suspension is transmitted to the other. Thus if there is a load on the front wheel, due to riding over a bump, this will tend to move the front wheel upwards relative to the main frame (the steering column sliding in the steering tube 29 and also the collar 30 pivoting): this movement pivots the crank 31 so as to pull forwardly on the rod 33, with the effect of moving the rear wheel upwards (pivoting its sub-frame about 20). If there is a load on the rear wheel, this tends to move the rear wheel upwards and push the rod 33 forwardly, in turn pivoting crank 31 so as to lift the front wheel. These movements are opposed resiliently by the compression springs 35, 36.

As the rider pushes down on the forward pedal the reaction to the force exerted causes an extra load on the front suspension. The resulting forward pull on the rod 33 is substantially the same as the rearward pull on the rod which occurs because the chain tension is tending to rotate the rear suspension downwards around the pivot 20. Thus the chain tension balances the reaction in the suspension resulting from the force exerted on the pedals.

The interaction between transmission and suspension provides for better responsiveness than in a conventional unsprung bicycle and the improvement is even more significant when riding on bumpy roads. Thus with the reactive suspension, every bump struck by either wheel causes an instantaneous increase in chain tension, if the rider continues pedalling. This gives the bicycle a lively response on poor road surfaces, in addition to its smooth, quiet and comfortable ride.

Figure 2:
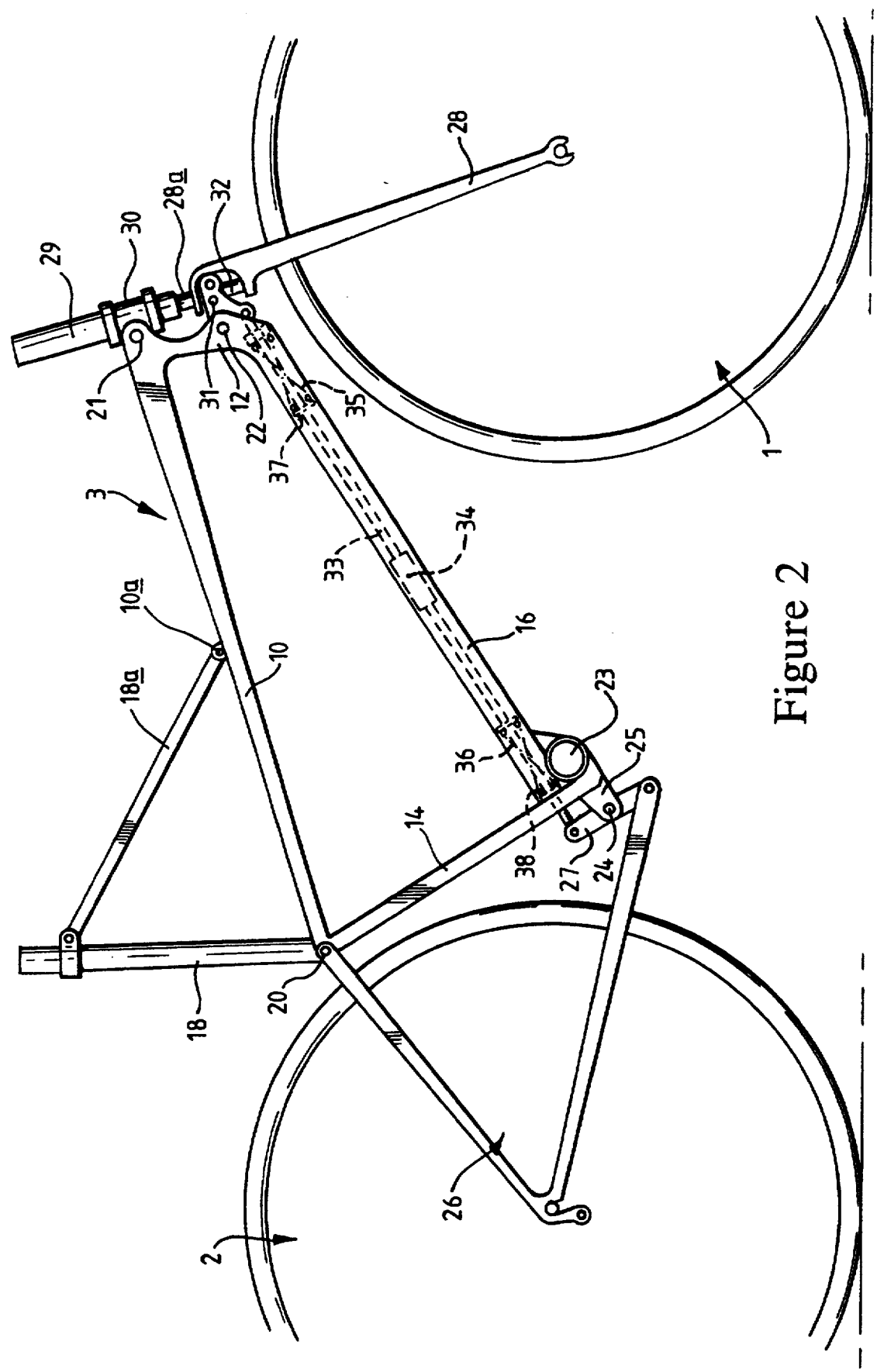
FIG. 2 is a diagrammatic side view of a pedal bicycle in accordance with a second embodiment of the invention.
Figure 3:
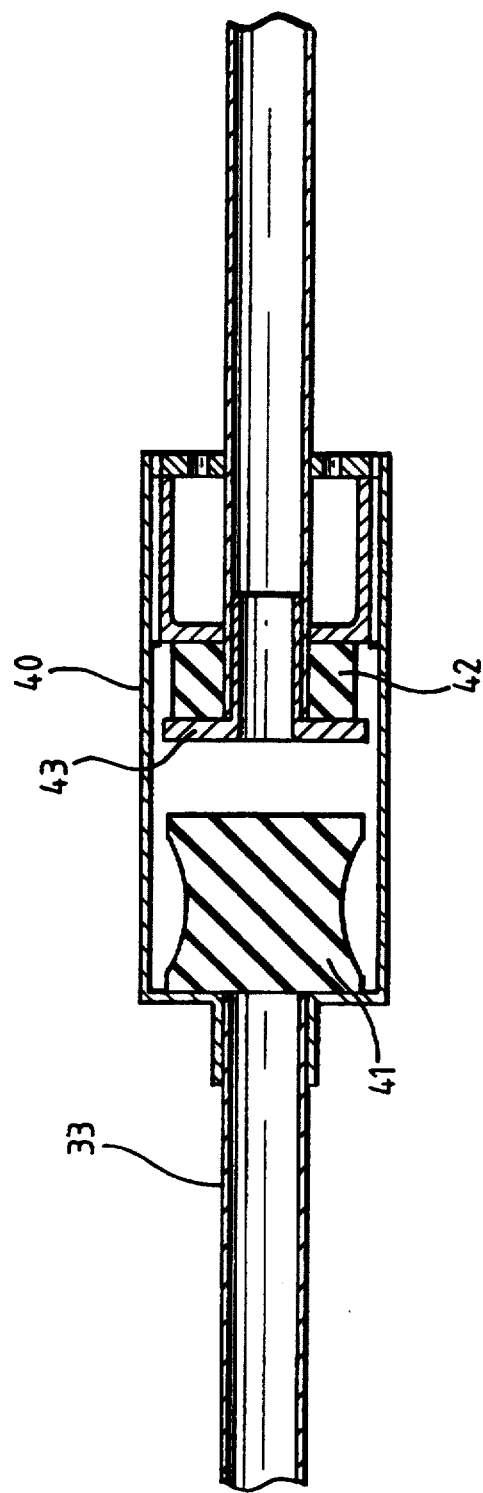
FIG. 3 is a longitudinal section through a lost-motion device incorporated in the interconnection system between the front and rear suspensions of the bicycle shown in FIG. 2.

The bicycle shown in FIG. 2 is the same as that shown in FIG. 1 (and like parts are given corresponding reference numerals) except that the rod 33 which interconnects the front and rear suspensions includes a lost-motion device 34. FIG. 3 shows this lost-motion device in detail: the device comprises a tubular housing 40 with the rear portion of rod 33 attached to one of its ends, with a rubber block 41 disposed within the housing 40 at this end. The front portion of the rod 33 is slidable in the front end of the housing 40 and carries a rubber block 42. It will be appreciated that in response to a load from the rear suspension displacing the rear portion of rod 33 forwardly, a certain amount of this movement must take place before rubber block 41 abuts the flange 43 to commence forward movement of the front portion of rod 33. Also initially a small gap exists between rubber block 42 and its seat against flange 43, so that in response to a load from the front suspension pulling the front portion of rod 16 forwardly, a certain amount of this movement must take place before flange 43 seats on rubber block 42 to commence pulling on the rear portion of rod 33. In use of the bicycle however, because of the weight of the rider both front and rear suspensions are loaded so that the rod 33 is under tension: any force pulling on either end of the rod 33 is therefore transmitted substantially fully to the other end of the rod.

Figure 4:
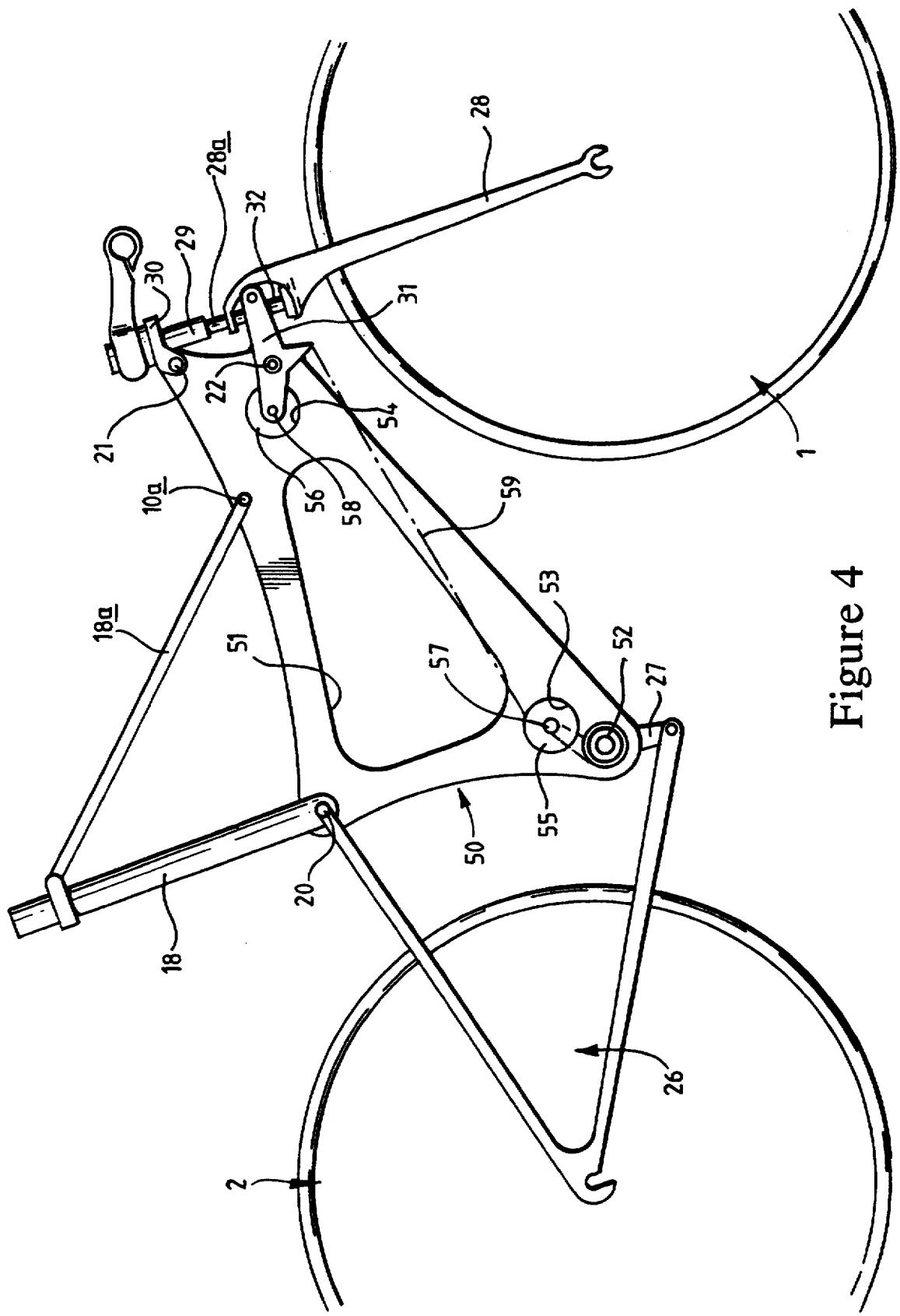
FIG. 4 is a diagrammatic side view of a pedal bicycle in accordance with a third embodiment of the invention.

FIG. 4 shows another embodiment of pedal bicycle in accordance with this invention, and exhibits a number of modifications relative to the bicycle shown in FIG. 1. Like parts in FIGS. 1 and 4 are denoted by like reference numerals. In the bicycle of FIG. 4, the frame 50 comprises a unitary, generally flat structure, optionally formed with a central aperture 51 to save weight. The frame 50 may be die-cast from metal or moulded from appropriate synthetic plastics e.g. reinforced with carbon fibre. The frame 50 is formed with the transverse bores 20, 10a, 21 and 22 for the same purposes as in the bicycle of FIG. 1: a further transverse bore 52 serves as a mounting for the crank axle and also for the pivotal lever 27. Two further transverse bores 53 and 54 are formed through the frame and mount circular rubber bodies 55, 56. Pegs 57, 58 projecting from lever 27 and crank 31, respectively, project into the centres of the rubber bodies 55, 56. These bodies provide resilient forces tending to return the lever 27 and crank 31, respectively to rest positions. A cable 59 extends between the lever 27 and the crank 31 to transmit a force under tension from one suspension to the other, in similar manner as described above in relation to the bicycle of FIG. 1.

It will be appreciated that because the several transverse bores through the bicycle frame, in each of the embodiments described above, are parallel to each other and perpendicular to the plane of the frame, the frame can conveniently be manufactured by moulding, the two halves of the mould being separated along an axis perpendicular to the plane of the frame.

What is claimed is:

1. A pedal cycle, comprising:
   a main frame;
   a front suspension displaceably mounted to said main frame;
   a front wheel rotatably mounted to said front suspension;
   a rear suspension pivotally mounted to said main frame;
   a rear wheel rotatably mounted to said rear suspension;
   a pair of pedals rotatably mounted via a crank axle to said main frame;
   a chain transmission for transmitting drive from said pair of pedals to said rear wheel, said rear suspension being pivoted to said main frame at a point above a line extending through said crank axle and rear wheel axle; and,
   means interconnecting said front suspension and said fear suspension so that any load on said front wheel, tending to lift said front wheel displacement of said front suspension relative to said main frame, applies a force to said interconnecting means which is transmitted by said interconnecting means to said rear suspension for displacing said rear suspension upwardly relative to said main frame, with said interconnecting means further acting so that a force applied thereto by said rear suspension, due to tension developed in said chain transmission by a rider pushing downward on a forward pedal of said pair of pedals, is substantially fully transmitted to said front suspension in opposition to a force applied to said interconnecting means due to a load placed on said front suspension by the rider pushing downward on said forward pedal.

2. The pedal cycle as claimed in claim 1, further comprising resilient biassing means for opposing said displacements of said front suspension and said rear suspension relative to said main frame.

3. The pedal cycle as claimed in claim 2, wherein said interconnecting means comprises a rod longitudinally movable relative to said main frame with said biassing means acting between said rod and said main frame for opposing longitudinal movement of said rod in a direction away from said rear suspension and towards said front suspension.

* * * * *